2 Sheets--Sheet 1.

J. H. RAYNARD, B. W. HATCH & W. P. HATCH.
Universal Joiners.

No. 138,284. Patented April 29, 1873.

Witnesses.
Sam¹. M. Barton
J. T. Wheeler

Inventors,
Joseph H. Raynard
Benj. W. Hatch
Wm. P. Hatch
by their atty
Daniel D. Wright

AM. PHOTO-LITHOGRAPHIC CO. N.Y. (OSBORNE'S PROCESS.)

J. H. RAYNARD, B. W. HATCH & W. P. HATCH.
Universal Joiners.
No. 138,284.  Patented April 29, 1873.
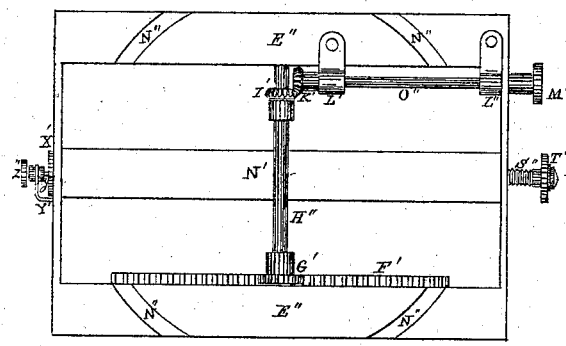
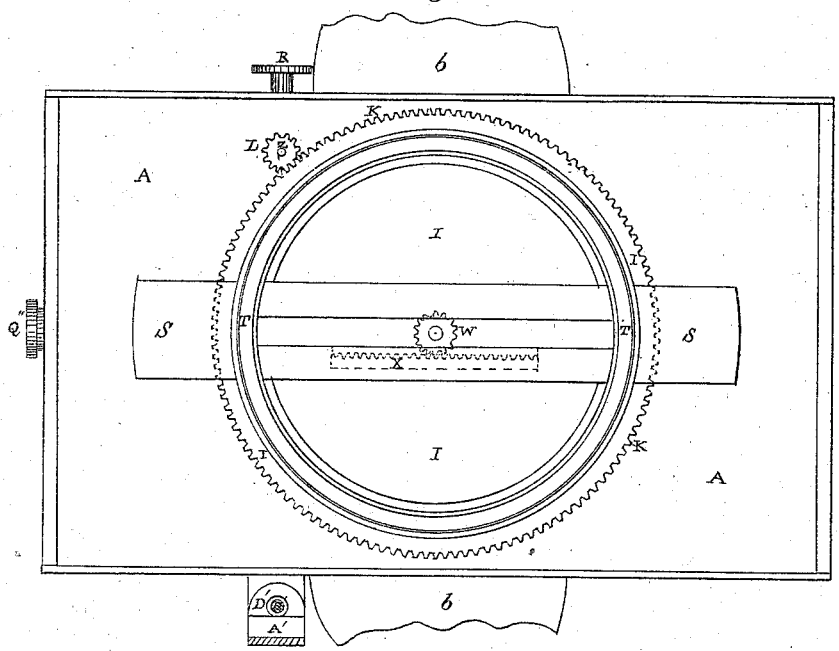

UNITED STATES PATENT OFFICE.

JOSEPH H. RAYNARD, BENJAMIN W. HATCH, AND WILLIAM P. HATCH, OF BOSTON, MASSACHUSETTS.

IMPROVEMENT IN UNIVERSAL JOINERS.

Specification forming part of Letters Patent No. 138,284, dated April 29, 1873; application filed August 14, 1872.

*To all whom it may concern:*

Figure 1:
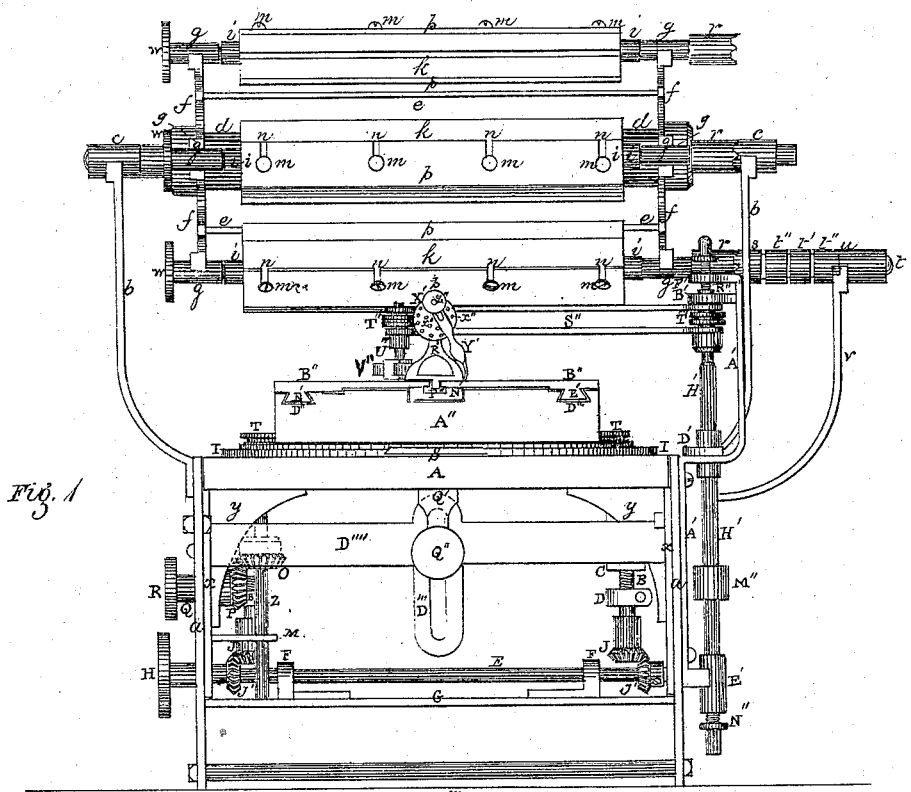
Figure 2:
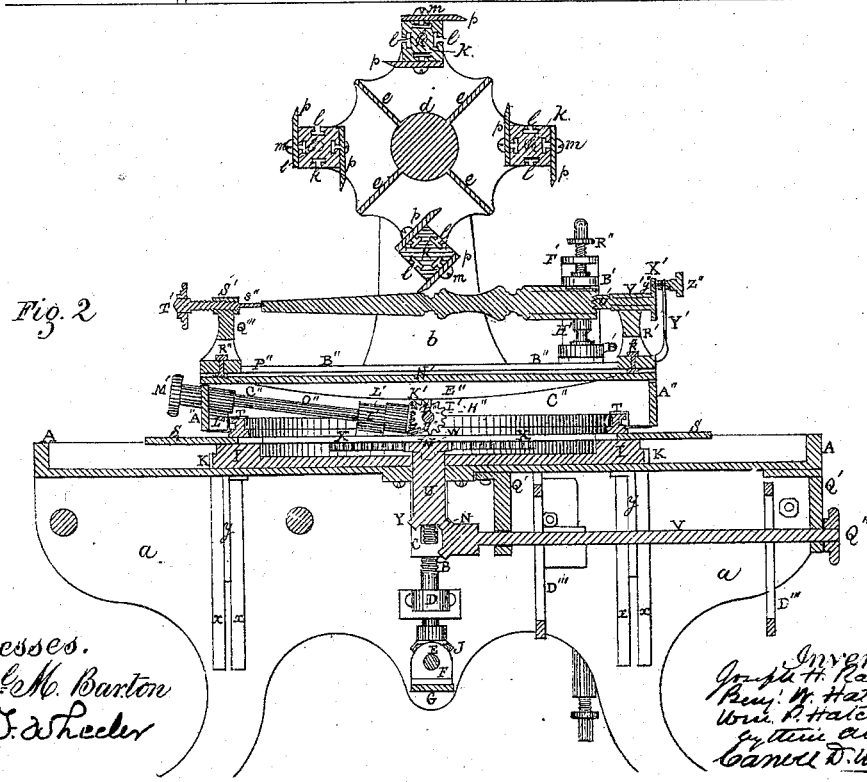

Be it known that we, JOSEPH H. RAYNARD, BENJAMIN W. HATCH, and WILLIAM P. HATCH, of Boston, in the county of Suffolk and State of Massachusetts, have invented certain Improvements in Universal Joiners, of which the following is a specification:

Figure 1 of the accompanying drawing is an end view. Fig. 2 is a central vertical longitudinal section. Fig. 3 is a top view of the turn-table, &c., with the upper platform removed; and Fig. 4 is a bottom view of the upper platform of our improved machine.

The present invention relates to certain new and useful improvements in machines for planing, turning, cutting, or otherwise forming wood in any desired form, its principal object being to form any square, polygonal, curved, regular, or irregular shape in wood. Our improvements consist mainly in a series of mechanical devices arranged and operated, as will be more fully explained in due course, so that the object to be operated upon is brought at any desired angle or turned in any direction required to receive the action of one or more revolving adjustable cutters, acting in connection with or independently of a revolving frame, and be planed, cut, turned, molded, fluted, curved, or otherwise formed in any desired shape.

In the drawing, $a$ represents the frame of my improved machine, to each side of which are attached upright standards $b$, curved at the bottom and formed on the top with sockets $c$ that form bearings for the ends of a central shaft, $d$, radiating from which are partitions or shields $e$, connecting at each end with frames $f$, the outer peripheries of which are formed to support sockets $g$ that serve as bearings for the ends of shafts $i$, connected with cylinders or heads $k$ arranged with T-slots $l$ to admit an adjustable plate that receives the ends of screws $m$, which allow the admission of slots $n$ formed in the backs of blades or cutters $p$, which are thus held to or are permitted to be released from the cylinders or heads $k$, which may be fitted with blades or cutters arranged to perform the different kinds of work required, and are made to revolve. A stem-clutch, $r$, is formed on one end of the shafts $i$, and engaging with a clutch-pulley, $s$, turning in the standard $b$, and on a shaft, $t$, on which revolves a loose pulley, $t'$, and which is provided with suitable belt-pulleys $t''$, and is supported in a socket, $u$, formed on the top of a curved standard, $v$, attached to the frame $a$. The shafts $i$ are each provided at the other end with a wheel, $w$, by which the heads $k$ may be turned either way and brought in the proper position. Attached to each side of the frame $a$, on the interior, are ways $x$, in which travel up and down knees or braces $y$ attached to the bottom and supporting a bed or platform, A, which is raised or lowered by the action of vertical screw-rods B turning in bearings C D formed with female screw-threads, and attached respectively to the bottom of the platform A and to each side of the interior of the frame $a$. The screw-rods B are provided at the bottom with horizontal bevel-gears J, that engage with vertical bevel-gears J′ connected with the ends of a transverse shaft, E, that is supported by standards F attached to a cross-bar, G, connected at each end with the inside of the frame $a$, and is operated by a wheel, H. On the top of the platform A, in the center, is a circular turn-table, I, having a lower projecting cog-rim, K, with which engages a cog-wheel, L, Fig. 4, attached to a vertical shaft, Z, that extends below the platform A, where it turns in bearings M attached to the inside of the frame $a$, and is provided with a horizontal bevel-gear, O, that engages with a vertical bevel-gear, P, connected with a horizontal shaft, Q, turning in the side of the frame $a$ and operated by a wheel, R. A portion of the upper rim or bed of the turn-table I is cut away so as to receive and hold, and yet admit of the forward movement and travel of, a slotted bar, S, connected with the bottom of a circular upper frame, T, which rotates with the turn-table I, on the top of which rotates a cog-wheel, W, connected with a shaft, U, extending downward, and provided with a horizontal bevel-gear, Y, that engages with a vertical bevel-gear, N, connected with a longitudinal shaft, V, which travels up and down in slotted girts D‴ connected with the frame $a$. The shaft V is supported by standards Q′ attached to the platform A, and is operated by a wheel, Q″, so as to engage the cog-wheel W with a rack-bar, X, connected with and extending some distance longitudinally beneath one side of the slotted bar S, which extends at each end beyond the circular frame T, whose rim is formed with a groove, and projects at the bottom to receive and form a seat for the bottom or frame A″ of an upper platform or bed, B″, which is arranged to turn on and with the circular frame T, and to travel back and forth with it on the turn-table I. The bottom of the bed or platform B″ is formed on each side with curved bars or plates E″, having tenon or other suitably shaped rails E′, curved on the bottom, and traveling in curved mortise or other suitably shaped ways D″ formed in the tops of the sides C″ of the frame or platform A″. The sides C″ are formed on the top with a concave curve to form a seat for the curved bottom of the plates E″ of the frame A″, which is made to travel longitudinally either way on the inclines formed by the curved sides C″. Attached to one side of the interior of the platform B″ is a curved rack-bar, F′, engaging with which is a cog-wheel, G′, connected with a transverse shaft, H″, provided with a bevel-gear, I′, engaging with a bevel-gear, K′, attached to a longitudinal shaft, O″, supported by bearings L′ L″, and operated by a wheel, M′. The under sides of the bars or plates E″ are formed with segmental grooves N″, so as to fit over the upper rim of the circular frame T, and allow the bed or platform B″ to turn on, yet independently of, the frame T. The upper bed or platform B″ is arranged on the bottom with a longitudinal flanged plate, N′, forming the bottom of a T-slot, P″, the upper part of which is formed lengthwise in the center of the bed B″, and in which adjustable standards Q‴ and R′ are arranged to travel back and forth, so as to be carried either nearer to or further from each other, according to the length of the object to be operated upon, which is held at one end by the pointed termination of a screw, s‴, turning in a socket, S′, formed in the top of the standard Q‴, and operated by a wheel, T′, and at the other end is sustained by a stem, U′, formed on the end of a spindle, V′, turning in a socket formed on the top of the standard R′, and operated by a disk or wheel, X′, formed with apertures x″, in the desired one of which engages a pin, y‴, connected with a thumb-stem, z‴, and operated by a bent spring, Y′. The standards Q‴ R′ are readily adjusted to and on the bed B″ by means of screws R″, provided with heads and nuts, or by any other suitable method.

The bed B″ and standards Q‴ R′ may, if desired, be arranged in any other suitable way, so that the latter may be readily adjusted to and operated forward and back on the former. The clutch ends r of the shafts i may, with the clutch-pulley s and shaft t, &c., be arranged on either end of the shaft i, or on either side of the machine that may be desired.

Attached to the frame a is a standard, A′, provided with bearings B′ D′ E′, in which turns a vertical rod, H′, having a belt-pulley, M″, and supplied at each end, so as to be raised or lowered, with thumb-screws N″ R″. Projecting from and arranged to swing on the rod H′ is an arm, S″, formed at each end to admit and allow the revolution of pulleys T″ and T‴; the forward one, T‴, connects with a shaft or stem, U′, which revolves a spindle, V′, adjusted in its bottom, and is actuated by a belt, &c., connecting with the other pulley, T‴, which is operated by the vertical shaft H′.

The operation of our invention is as follows: It being required to plane or cut an even flat surface, the wood or other material to be operated upon is properly secured on the top of the circular frame T, or upon the top of the platform or bed B″, which are carried forward longitudinally by the power applied to the wheel Q″, which actuates the shaft V, and by means of the gears N and Y and shaft U rotates the cog-wheel W, and engages it with the rack-bar X connected with the slotted bar S attached to the frame T, which, either singly or together with the platform or bed B″, is fed along, thereby carrying the wood or other material under the blade p connected with one of the heads or cylinders k, which is, by the turning of the frame f, adjusted in its proper position and made to revolve by the power applied to the shaft t operating the clutch-pulley s, which is shoved in to receive the teeth of the clutch r, so as to connect it with the shaft i and bring the blades or cutters p against the wood or other material passing beneath them.

If any square or polygonal form is to be cut or planed, &c., the wood or other material is properly adjusted above the upper bed or platform B″, between the standards Q‴ R′, and held by the pointed screw s″ and stem U′, arranged to accommodate any desired length of post, &c. The wood or other material is then carried forward by the platform or bed B″, as before described, to receive the action of the proper blade or cutter p, which forms one side of the square or other polygonal shape required. By the reverse action of the cog-wheel W the circular upper frame T and platform B″ are carried back, and the post or other object to be operated upon is then turned by the screw-wheel T′ and disk or wheel X′, the desired width to which the sides are to be cut being regulated by the pin y″ engaging in the apertures x″, and the platform B″ is again advanced beneath the blade p and another side is formed. By thus repeating the above operation any number of sides may be cut to any regular width or otherwise operated upon, according to the blade or cutter used.

When a sloping shape is required to be cut or planed, &c., the upper platform or bed B″ is carried forward or backward on the curved sides C″ of the frame A″ by means of the cog-wheel G′ engaging with the curved rack-bar F′ and operated by the action of the shafts H″, O″, and gears I′ K′, to which power is communicated by the operation of the wheel M′, so as to elevate one end and lower the other end of the bed or platform B'', which is fed along, as before, under the blade or cutter $p$, thereby cutting or otherwise operating upon the wood in an inclined direction.

By applying power to the wheel R motion is imparted to the gears P O, which cause the vertical shaft Z to revolve the cog-wheel L, and, consequently, the turn-table I, the circular upper frame T, frame A'', and platform B'' are made to revolve under the blades or cutters $p$, which may be readily adjusted on the heads $k$ and arranged in any shape desired to plane, cut, or otherwise form or finish any molding, fluting, curved or other work desired upon or in or around the wood or other material, which is, by the several means above described, carried back and forth longitudinally, transversely, or diagonally, raised or lowered, inclined and rotated, or brought in any direction beneath the blades $p$ of the heads or cylinders $k$, each of which, in turn, according to the use for which it is desired, may, by the revolution of the shaft $d$, be brought in its proper position, where it is held by the clutch end $r$ of its shaft $i$ engaging with the clutch-pulley $s$, and revolved by the power applied to shaft $t$, which, by means of a cross-belt, may be reversed in its operation so as to revolve in an opposite direction the heads or cylinders $k$, and cause the blades or cutters $p$ to operate contrarily against the wood or other material. The shields $e$ are formed between the heads $k$ to strengthen the frames $f$, and to break up the chips and prevent the shavings and dust, &c., from the blades of one head, $k$, interfering with the blades of the next head. The platform A, and consequently the turn-table I and upper platform or bed B'' connected with it, are raised or lowered to accommodate wood or other material of different thickness to the blades $p$ by means of the vertical screw-rods B turning in the bearings C D, and operated by the motion imparted to the gears J J' by the revolution of the shaft E, which is actuated by the power applied to the wheel H.

The turn-table I and circular upper frame T may be used independently of the upper frame A'' and platform B'', which are only employed on occasions when it is required to form or operate on inclined work, or to form regular-sided objects, although the platform B'' and its frame A'' may be used, in connection with the turn-table I and frame T, for almost any description of work required, as it is made to travel back and forth in any direction with them, or to revolve with or independently of them.

The object of the cutter V', which is, by the swinging arm S'', brought in any desired position over the object to be operated upon, which is placed on the bed B'' or upper circular frame T and revolved by the turn-table I, is to cut or otherwise operate on the under side of arched work or the inside of circular or other curved work, such as picture-frames, &c., and is actuated against the object revolved or otherwise brought beneath it by the power applied to the shaft H', which revolves the pulley T''' connected with it, and, by means of an endless belt, &c., uniting with the pulleys T'' T'''', rotates the stem U'' and the cutter V'', so that the object carried below it is formed in the desired manner, cutters of any desired form being inserted in the bottom of the stem U''.

By the above description of our invention, reference being had to the drawing, it will readily be seen that by the revolution of the turn-table I and the circular frame T, together with the forward and back motion of the latter, any object placed on the frame T may be brought in any desired direction, either longitudinally, transversely, or diagonally, under the blades or cutters $p$, which may be arranged in any shape desired and easily adjusted to their heads $k$, so that any form of molding, beading, fluting, curve, &c., may be cut or otherwise worked in any position on the object with which they are thus brought in contact. It will also be seen that by the use of the upper platform or bed B'', the curved plates E'' of which are made to travel forward or back on the curved sides C'' of the frame A'' so as to raise one end of the platform B'' and lower the other end, a sloping or inclined position is given to the wood or other material, which may be cut or otherwise operated upon in any direction by the operation of the frame A'', which is, as hereinbefore described, propelled forward or backward longitudinally, transversely, or diagonally, raised or lowered, revolved independently of or with the turn-table I and frame T, so as to carry the object in any direction under the blades or cutters $p$, and be cut, molded, fluted, or otherwise formed in any shape or manner desired, according to the kind of blade or cutter used.

Our invention may be employed for forming or planing, &c., any regular or irregular shape whatever, such as piano-forte or billiard-table legs, balusters, &c. Columns, panels, or other work may be fluted or molded, &c. Circular, oval, or any curved work—such as arched work, moldings, picture and other frames, &c.—may be cut or otherwise operated upon on the inside as well as the outside. It is useful for carriage-work, forming spokes, fellies, rims, and ax-beds, &c. It may be used as a surface-planing machine, and for various other purposes that will be apparent to any one versed in machinery, and which are too numerous to specify herein.

Having thus fully described our improvements, what we claim as our invention, and desire to have secured to us by Letters Patent, is—

1. The combination of the upper bed or platform B'', provided with curved bars or plates E'', curved rack-bar F', and curved rails E', traveling in curved ways D'' formed in the top of curved sides C'' of a frame, A'', formed with segmental grooves N'', and operated by cog-wheel G', shaft H'', gears I' K', shaft O'', and wheel M', substantially as specified.

2. The combination of the circular upper frame T formed with grooved projecting rim, and provided with slotted bar S, rack-bar X, and operated by cog-wheel W, gears Y N, shafts U V, and wheel Q'', substantially as specified.

3. The upper platform or bed B'' and frame A'', arranged as herein described, in combination with the upper circular frame T, arranged and operated substantially as specified.

4. The turn-table I formed with cog-rim K, and to hold and allow the forward and backward travel of the slotted bar S, and operated by a cog-wheel L, shafts Z Q, gears O P, and wheel R so as to revolve on platform A, in combination with the circular upper frame T, arranged and operated substantially as specified.

5. The platform A, having knees or braces $y$, traveling up and down in ways $x$, and provided with bearings C D, screw-rods B, gears J J', shaft E, and wheel H for raising or lowering the platform A, in combination with the frame $a$ and turn-table I, arranged and operating substantially as specified.

6. The combination of platform A, turn-table I, frame T, platform B'', frame A'', all arranged and operated substantially as and for the purposes specified.

7. The combination of the swinging arm S'', cutter-spindle V'', shaft H', platform A, turn-table I, frame T, upper platform B'', frame A'', and frame $a$, all arranged and operated substantially as specified.

8. The adjustable standard R' arranged with spindle V', disk X' having apertures $x''$, in which engages a pin, $y''$, connected with bent spring Y', in combination with the bed or platform B'' and adjustable standard Q''', all arranged and operated as and for the purpose specified.

In testimony whereof we have signed our names to this specification in the presence of two subscribing witnesses.

JOSEPH H. RAYNARD.
    BENJAMIN W. HATCH.
    WM. P. HATCH.

Witnesses:
 CARROLL D. WRIGHT,
 SAML. M. BARTON.